US010071734B2

(12) United States Patent
Sakai et al.

(10) Patent No.: US 10,071,734 B2
(45) Date of Patent: *Sep. 11, 2018

(54) COURSE EVALUATION APPARATUS AND COURSE EVALUATION METHOD

(71) Applicant: Toyota Jidosha Kabushiki Kaisha, Toyota-shi Aichi-ken (JP)

(72) Inventors: Katsuhiro Sakai, Hadano (JP); Toshiki Kindo, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,041

(22) Filed: Dec. 9, 2016

(65) Prior Publication Data

US 2017/0088133 A1 Mar. 30, 2017

Related U.S. Application Data

(63) Continuation of application No. 12/344,836, filed on Dec. 29, 2008, now Pat. No. 9,552,733.

(30) Foreign Application Priority Data

Dec. 25, 2007 (JP) ................. 2007-332956

(51) Int. Cl.
*B60W 30/095* (2012.01)
*G08G 1/16* (2006.01)
*B62D 15/02* (2006.01)

(52) U.S. Cl.
CPC ....... *B60W 30/095* (2013.01); *B62D 15/0265* (2013.01); *G08G 1/167* (2013.01)

(58) Field of Classification Search
None
See application file for complete search history.

(56) References Cited

U.S. PATENT DOCUMENTS

| 6,032,097 A * | 2/2000 | Iihoshi ..... G08G 1/22 180/168 |
| 7,739,031 B2 | 6/2010 | Tengler et al. |
| 8,255,162 B2 * | 8/2012 | Okude ..... G01C 21/3484 701/410 |
| 2011/0071731 A1 * | 3/2011 | Eidehall ..... G01S 7/295 701/42 |

FOREIGN PATENT DOCUMENTS

| JP | 7-104062 A | 4/1995 |
| JP | 8261773 A | 10/1996 |
| JP | 10306844 A | 11/1998 |
| JP | 2006-154967 A | 6/2006 |
| JP | 2006-184127 A | 7/2006 |
| JP | 2007-230454 A | 9/2007 |

* cited by examiner

Primary Examiner — Florian M Zeender
Assistant Examiner — Denisse Y Ortiz Roman
(74) Attorney, Agent, or Firm — Dinsmore & Shohl LLP

(57) ABSTRACT

A course evaluation apparatus includes an estimated-course-group generation portion that generates a plurality of estimated course groups for a movable body; and a course evaluation portion that performs a course evaluation on the plurality of estimated course groups with respect to at least two different evaluation criteria.

12 Claims, 7 Drawing Sheets

100# COURSE EVALUATION APPARATUS AND COURSE EVALUATION METHOD

CROSS-REFERENCE TO RELATED APPLICATIONS

This application is a continuation of U.S. patent application Ser. No. 12/344,836 filed Dec. 29, 2008, which in turns claims the priority of Japanese Patent Application No. 2007-332956 filed on Dec. 25, 2007, both of which are incorporated herein by reference in their entirety.

BACKGROUND OF THE INVENTION

1. Field of the Invention

The invention relates to a course evaluation apparatus and a course evaluation method that perform a course evaluation for a movable body such as a vehicle.

2. Description of the Related Art

Japanese Patent Application Publication No. 2007-230454 (JP-A-2007-230454) describes an apparatus that evaluates a course for a movable body. The apparatus evaluates a course along which a specific object among a plurality of objects may move. The apparatus generates trajectories indicating time-dependent changes in positions at which the plurality of objects may be located, in a time-space constituted by time and space. Then, the apparatus estimates courses along which the plurality of objects may move, using the trajectories. Then, the apparatus quantitatively calculates the degree of interference between the course along which the specific object may move and the courses along which the other objects may move, using the results of the estimation.

The apparatus evaluates the courses with respect to one evaluation criterion, that is, the degree of interference (possibility of collision). However, the courses may be evaluated with respect to other evaluation criteria such as the efficiency of movement (degree of smoothness of movement), in addition to the degree of interference. For example, a plurality of estimated courses may be generated, the estimated courses may be evaluated with respect to two evaluation criteria, that is, the degree of interference and the efficiency of movement, and the optimum estimated course may be selected.

However, in this case, there is a possibility that one estimated course meets the evaluation criterion of the degree of interference, but does not meet the evaluation criterion of the efficiency of movement, and the other estimated course meets the evaluation criterion of the efficiency of movement, but does not meet the evaluation criterion of the degree of interference. As a result, it may not be possible to find an appropriate estimated course. That is, it may not be possible to select an appropriate course.

SUMMARY OF THE INVENTION

The invention provides a course evaluation apparatus and a course evaluation method that select an appropriate course by generating groups of estimated courses, and evaluating the groups.

An aspect of the invention relates to a course evaluation apparatus that includes an estimated-course-group generation portion that generates a plurality of estimated course groups for a movable body; and a course evaluation portion that performs a course evaluation on the plurality of estimated course groups with respect to at least two different evaluation criteria.

According to the aspect, the course evaluation is performed on the plurality of estimated course groups with respect to at least two different evaluation criteria. Thus, even when there is no estimated course whose evaluation values with respect to the plurality of evaluation criteria are equal to or higher than respective predetermined values, there is the estimated course group whose evaluation values with respect to the plurality of evaluation criteria are equal to or higher than the respective predetermined values. Therefore, it is possible to select an appropriate course, by selecting the estimated course group whose evaluation values with respect to the plurality of evaluation criteria are equal to or higher than the respective predetermined values.

In the course evaluation apparatus according to the aspect, the estimated-course-group generation portion may generate a plurality of close courses that extend from the movable body, and may generate at least one subsequent course that extends from each of the plurality of close courses; and the estimated-course-group generation portion may generate the estimated course groups in a manner such that each of that estimated course groups includes a corresponding one of the close courses, and the at least one subsequent course that extends from the corresponding one of the close courses.

In this case, the plurality of close courses that extend from the movable body are generated, and at least one subsequent course that extends from each of the plurality of close courses is generated. The estimated course groups are generated in a manner such that each of that estimated course groups includes a corresponding one of the close courses, and the at least one subsequent course that extends from the corresponding one of the close courses. Therefore, it is possible to generate the plurality of estimated course groups based on the plurality of close courses.

In the course evaluation apparatus according to the aspect, the estimated-course-group generation portion may generate a plurality of estimated courses, and may classify similar estimated courses among the plurality of estimated courses into one estimated course group.

In this case, the plurality of estimated courses are generated, and similar estimated courses among the plurality of estimated courses are classified into one estimated course group. Thus, it is possible to generate the plurality of estimated course groups each of which includes the similar estimated courses.

In the course evaluation apparatus according to the aspect, the course evaluation portion may perform the course evaluation on each of the estimated course groups, using the highest evaluation value among evaluation values of courses included in the estimated course group, as an evaluation value of the estimated course group.

In the configuration, the course evaluation is performed on each of the estimated course groups, using the highest evaluation value among the evaluation values of the courses included in the estimated course group, as the evaluation value of the estimated course group. Therefore, it is possible to select an appropriate estimated course with respect to the evaluation criteria, and accordingly, to select a good course.

In the course evaluation apparatus according to the aspect, the course evaluation portion may perform the course evaluation on each of the estimated course groups, based on whether an evaluation value of each of courses included in the estimated course group with respect to each of the evaluation criteria is equal to or higher than a predetermined threshold value.

In the configuration, the course evaluation is performed on each of the estimated course groups based on whether an evaluation value of each of the courses included in the estimated course group with respect to each of the evaluation criteria is equal to or higher than the predetermined threshold value. Thus, it is possible to avoid the situation where the movable body moves along the course that has an extremely low evaluation value with respect to the evaluation criterion such as the degree of safety of movement. Thus, the movable body safely moves along the course.

In the course evaluation apparatus according to the aspect, if a moving speed of the movable body is equal to or higher than a set speed value, the estimated-course-group generation portion may generate sample courses as estimated courses by sampling generated possible courses, in a manner such that the number of the sample courses is smaller than the number of the generated possible courses; and if the moving speed of the movable body is lower than the set speed value, the estimated-course-group generation portion may use the generated possible courses as the estimated courses.

In the configuration, if the moving speed of the movable body is equal to or higher than the set speed value, the sample courses are generated as the estimated courses by sampling the generated possible courses, in a manner such that the number of the sample courses is smaller than the number of the generated possible courses; and if the moving speed of the movable body is lower than the set speed value, the generated possible courses are used as the estimated courses. Thus, if the movable body moves at a high speed, it is possible to reduce the number of the estimated courses, and to evaluate a long course. If the movable body moves at an intermediate speed or a low speed, it is possible to accurately evaluate the estimated course in detail.

In the course evaluation apparatus according to the aspect, the movable body may be a vehicle that travels on a road; if the road on which the vehicle travels is an expressway or a freeway that is not an ordinary road, the estimated-course-group generation portion may generate sample courses as estimated courses by sampling generated possible courses, in a manner such that the number of the sample courses is smaller than the number of the generated possible courses; and if the road on which the vehicle travels is the ordinary road, the estimated-course-group generation portion may use the generated possible courses as the estimated courses. In the course evaluation apparatus according to the aspect, the movable body may be a vehicle that travels on a road; if the degree of congestion on a road on which the vehicle travels is lower than a predetermined value, the estimated-course-group generation portion may generate sample courses as estimated courses by sampling generated possible courses, in a manner such that the number of the sample courses is smaller than the number of the generated possible courses; and if the degree of congestion on the road on which the vehicle travels is equal to or higher than the predetermined value, the estimated-course-group generation portion may use the generated possible courses as the estimated courses.

Another aspect of the invention relates to a course evaluation method that includes generating a plurality of estimated course groups for a movable body; and performing a course evaluation on the plurality of estimated course groups with respect to at least two different evaluation criteria.

According to the above-described aspects, it is possible to select an appropriate course, by generating the groups of the estimated courses, and evaluating the groups.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
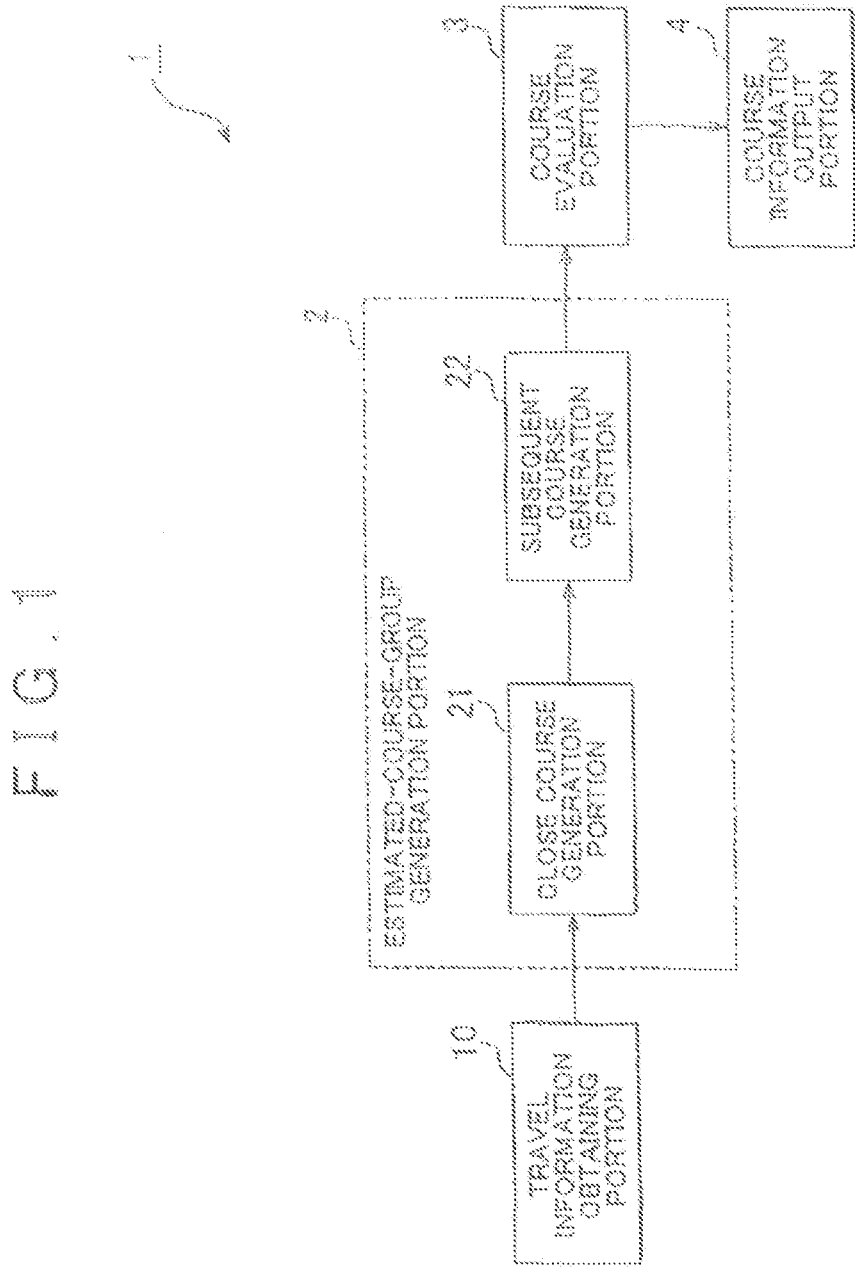
FIG. 1 is a schematic diagram showing the configuration of a course evaluation apparatus according to a first embodiment of the invention.

Hereinafter, embodiments of the invention will be described in detail with reference to the accompanying drawings. In the description of the drawings, the same and corresponding elements are denoted by the same reference numerals, and the repeated description thereof will be omitted.

FIG. 1 is a schematic diagram showing the configuration of a course evaluation apparatus according to a first embodiment of the invention.

The course evaluation apparatus 1 according to the first embodiment is applied to a controller for an automatically-operated vehicle. The course evaluation apparatus 1 evaluates estimated courses for the vehicle.

As shown in FIG. 1, the course evaluation apparatus 1 according to the first embodiment includes an estimated-course-group generation portion 2, and a course evaluation portion 3. For example, the course evaluation apparatus 1 is configured mainly using a computer that includes a CPU, a ROM, and a RAM. In the course evaluation apparatus 1, the functions of the estimated-course-group generation portion 2 and the course evaluation portion 3 are performed using a computer program. In the course evaluation apparatus 1, the estimated-course-group generation portion 2 and the course evaluation portion 3 may be constituted by separate hardware devices, that is, the functions of the estimated-course-group generation portion 2 and the course evaluation portion 3 may be performed in separate hardware devices.

The estimated-course-group generation portion 2 generates groups of estimated courses for a vehicle. The estimated-course-group generation portion 2 includes a close course generation portion 21 and a subsequent course generation portion 22. The close course generation portion 21 generates possible courses that are close to the vehicle. The generated possible course extends from the vehicle (hereinafter, the courses that are close to the vehicle, and that extend from the vehicle may be referred to as "close courses"). For example, the close course generation portion 21 generates the close courses based on, for example, travel information output from a travel information obtaining portion 10.

The travel information obtaining portion 10 obtains the travel information that includes vehicle travel information, such as the speed and the steering angle of the vehicle, surrounding area information, such as detected positions and detected speeds of an object and the other vehicle in an area surrounding the vehicle, and road information, such as a map. The travel information obtaining portion 10 obtains the travel information by receiving signals from, for example, sensors and a navigation system provided in the vehicle.

The subsequent course generation portion 22 generates at least one possible subsequent course that extends from each close course. The subsequent course generation portion 22 generates the subsequent courses based on, for example, the travel information output from the travel information obtaining portion 10.

Figure 2:
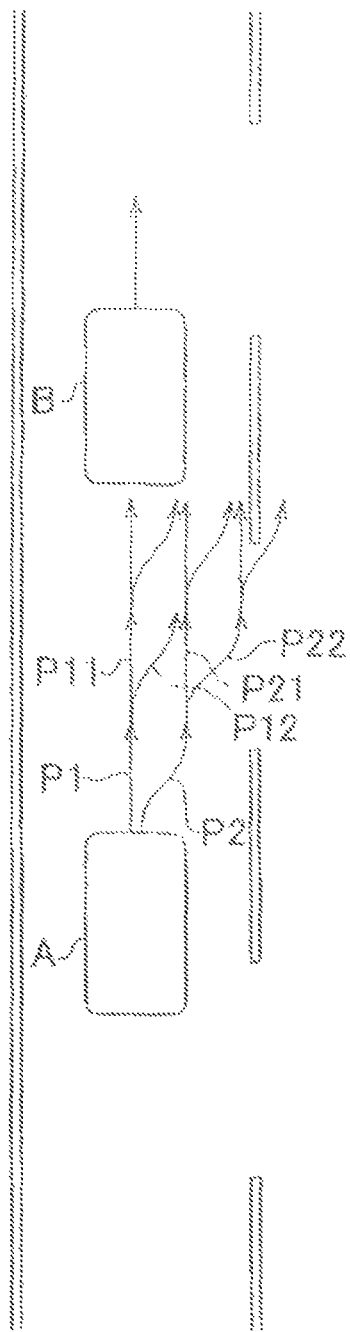
FIG. 2 is a diagram illustrating how estimated courses are generated in the course evaluation apparatus shown in FIG. 1.

For example, as shown in FIG. 2, the close course generation portion 21 uses the position of a vehicle A as a starting point, and generates a plurality of close courses p1 and p2 that extend from the starting point. Then, subsequent courses p11 and p12 continuous with the close course p1 are generated, and subsequent courses p21 and p22 continuous with the close course p2 are generated. The close courses p1 and p2 and the subsequent courses p11, p12, p21, and p22 are generated based on, for example, the travel information that includes the vehicle travel information, such as the speed and the steering angle of the vehicle, the surrounding area information, such as the detected positions and detected speeds of an object and the other vehicle in the area surrounding the vehicle, and the road information, such as a map. In this case, the close courses p1 and p2, and the subsequent courses p11, p12, p21, and p22 include courses when the vehicle A changes lanes, when the vehicle A travels in the right side or left side of a lane, and when the vehicle A is accelerated and decelerated in the lane. In addition, it is appreciated from FIG. 2 that the vehicle A is a host vehicle with respect to the close courses and subsequent courses.

In FIG. 1, the course evaluation portion 3 evaluates the estimated courses. The course evaluation portion 3 classifies similar estimated courses among a plurality of estimated courses into one group. The course evaluation portion 3 performs a course evaluation on each estimated course group with respect to at least two different evaluation criteria. For example, the course evaluation portion 3 classifies the courses continuous with the same close course into one estimated course group, and evaluates the estimated course group.

As the evaluation criteria, for example, the degree of driving safety, driving efficiency, and the degree of observance of driving rules are set. The degree of driving safety is the evaluation criterion that indicates, for example, whether the vehicle will contact the other vehicle or an object when the vehicle travels along the course. The driving efficiency is the evaluation criterion that indicates, for example, the distance that the vehicle travels, and the degree of smoothness of travel when the vehicle travels along the course. The degree of observance of driving rules is the evaluation criterion that indicates the degree of observance of traffic rules and driving regulations when the vehicle travels along the course. The evaluation criteria may include the other criterion (or criteria), in addition to the degree of driving safety, the driving efficiency, and the degree of observance of driving rules. Also, criteria other than the degree of driving safety, the driving efficiency, and the degree of observance of driving rules may be set as the evaluation criteria. Also, the evaluation criteria may include at least one of the degree of driving safety, the driving efficiency, and the degree of observance of driving rules. For example, the degree of driving safety and the driving efficiency may be set as the evaluation criteria.

When there are similar estimated courses among the plurality of estimated courses, the course evaluation portion 3 classifies the similar estimated courses into one estimated course group, and evaluates the estimated course group. For example, the course evaluation portion 3 classifies the courses continuous with the same close course into one estimated course group, and evaluates the estimated course group.

The determination as to whether a plurality of estimated courses are similar to each other will be described. For example, when a plurality of estimated courses are continuous with the same close course, the directions of a plurality of estimated course are in a set range, or a plurality of estimated courses exist within a set range, it is determined that the estimated courses are similar to each other. Also, when a plurality of estimated courses have the same course component in common, it may be determined that the estimated courses are similar to each other. In contrast, when the directions of a plurality of estimated courses are not in a set range, it is determined that the estimated courses are not similar to each other. Also, when a plurality of estimated courses do not have the same course component in common, it is determined that the estimated courses are not similar to each other.

It may be determined whether a plurality of estimated courses are similar to each other, taking into account the vehicle speed. For example, even when a plurality of estimated courses are continuous with the same close course, if the difference between the vehicle speeds in the estimated courses is not in a set range, it is determined that the estimated courses are not similar to each other. If the difference between the vehicle speeds is in the set range, it is determined that the estimated courses are similar to each other.

For example, when the estimated close courses p1 and p2 are generated, and the subsequent courses p11, p12, p21, and p22 that are continuous with the estimated courses p1 and p2 are generated as shown in FIG. 2, the subsequent courses p11 and p12 that are continuous with the close course p1 have the same course component of p1 in common, and therefore, the estimated course p1 and the subsequent courses p11 and p12 are classified into one group. Also, the subsequent courses p21 and p22 have the same course component of p2 in common, and therefore, the estimated course p2 and the subsequent courses p21 and p22 are classified into one group.

Then, the course evaluation is performed on each estimated course group with respect to at least two different evaluation criteria. For example, the course evaluation is performed on each of the estimated course group including the estimated course p1 and the estimated course group including the estimated course p2 with respect to the two evaluation criteria, that is, the degree of driving safety and the driving efficiency.

The highest evaluation value among evaluation values of the estimated courses that belong to the estimated course group may be used as the evaluation value of the estimated course group. For example, the estimated course p1 to p12 has the highest evaluation value with respect to the degree of driving safety, and the highest evaluation value is used as the evaluation value of the estimated course group including the estimated course p1 with respect to the degree of driving safety. The estimated course p1 to p11 has the highest evaluation value with respect to the driving efficiency, and the highest evaluation value is used as the evaluation value of the estimated course group including the estimated course p1 with respect to the driving efficiency. In this case, even when a preceding vehicle B is suddenly braked, and therefore, the degree of driving safety decreases, it is possible to ensure the required level of driving safety by selecting the estimated course p1 to p12. Unless an emergency situation occurs, for example, unless the preceding vehicle B is suddenly braked, high driving efficiency is achieved by selecting the estimated course p1 to p11.

Information regarding the evaluations made by the course evaluation portion 3 is input to a course information output portion 4. The course information output portion 4 selects the course along which the vehicle should travel, and outputs information on the selected course to, for example, a drive control unit and a steering control unit of the vehicle.

Figure 3:
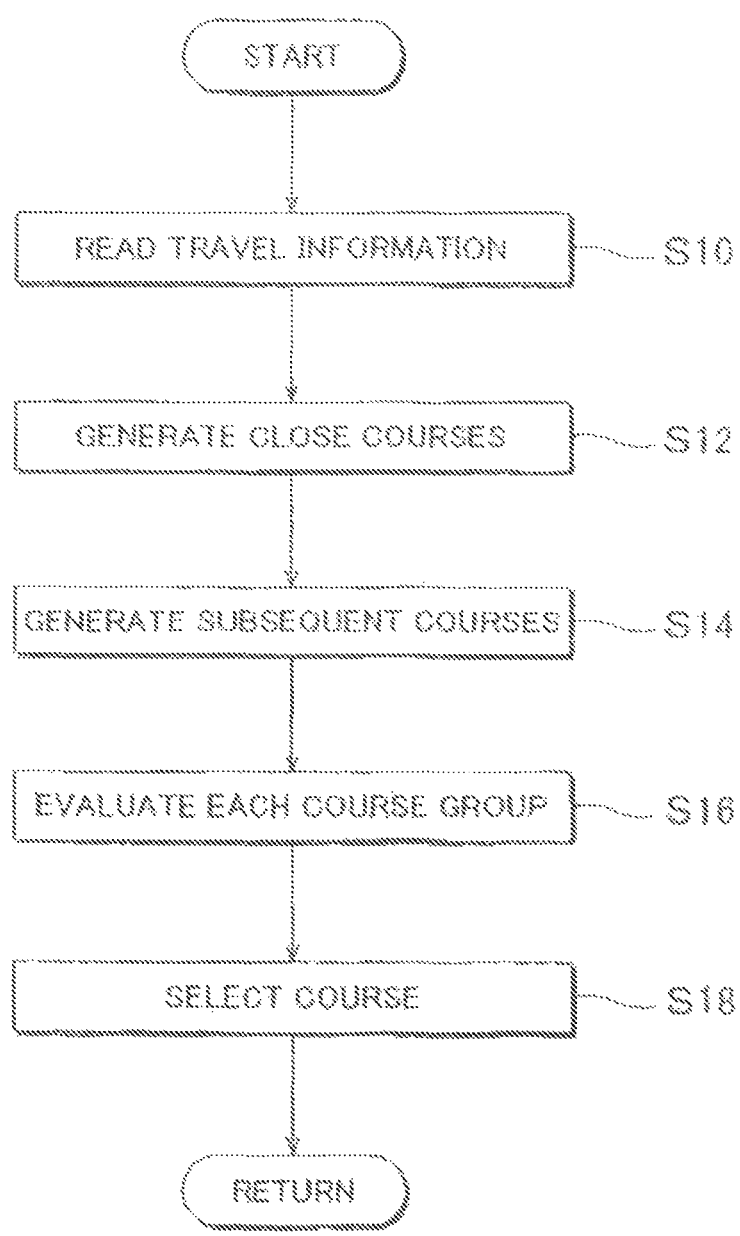
FIG. 3 is a flowchart showing the operation of the course evaluation apparatus shown in FIG. 1.

FIG. 3 is a flowchart showing the operation of the course evaluation apparatus according to the embodiment.

The control shown in FIG. 3 is executed in a predetermined cycle (for example, a cycle of 100 to 1000 ms), and repeatedly executed. As shown in FIG. 3, first, in step S10, a travel information obtaining process is executed. In the travel information obtaining process, the information on the travel of the vehicle output from the travel information obtaining portion 10 is read. For example, the travel information includes the vehicle travel information, such as the speed and the steering angle of the vehicle, the surrounding area information, such as the detected positions and detected speeds of an object and the other vehicle in the area surrounding the vehicle, and the road information, such as a map.

Then, in step S12, a close course generation process is executed. In the close course generation process, the estimated close courses that are close to the vehicle, and that extend from the vehicle are generated. For example, the close courses along which the vehicle may travel are generated, based on the travel information read in step S10. For example, in FIG. 2, the estimated course p1, which is a straight course, and the estimated course p2, which is a curved course, are generated.

Then, in step S14, a subsequent course generation process is executed. In the subsequent course generation process, subsequent courses continuous with each estimated close course extending from the vehicle are generated. That is, the subsequent courses that extend from each estimated close course are generated. For example, the subsequent courses which are continuous with each estimated close course, and along which the vehicle may travel are generated based on the travel information read in step S10. For example, in FIG. 2, the subsequent courses p11 and p12 that are continuous with the estimated close course p1 are generated, and the subsequent courses p21 and p22 that are continuous with the estimated close course p2 are generated.

Then, in step S16, the course evaluation is performed on each course group. The course evaluation is performed on each course group with respect to at least two different evaluation criteria. For example, the course evaluation is performed on each of the course group including the estimated course p1 and the course group including the estimated course p2 with respect to two evaluation criteria, that is, the degree of driving safety and the driving efficiency. In this case, the estimated course p1 and the estimated courses continuous with the estimated course p1 are classified into one course group, and the estimated course p2 and the estimated courses continuous with the estimated course p2 are classified into one course group. Then, the course evaluation is performed on each course group.

When the course evaluation is performed on each course group, the highest evaluation value among the evaluation values of the courses included in the course group may be used as the evaluation value of the course group. For example, a high evaluation value with respect to the degree of driving safety is given to the course group including the estimated course p1, because the course group includes the course that makes it possible for the vehicle to avoid the preceding vehicle B even if the preceding vehicle B is suddenly braked. A high evaluation value with respect to the driving efficiency is also given to the course group including the estimated course p1, because the course group includes the course along which the vehicle travels straight ahead. In contrast, a high evaluation value with respect to the degree of driving safety is given to the course group including the estimated course p2, because the group includes the course that makes it possible for the vehicle to avoid the preceding vehicle B even if the preceding vehicle B is suddenly braked. However, a high evaluation value with respect to the driving efficiency is not given to the course group including the estimated course p2, because the group does not include a course along which the vehicle travels straight ahead.

Thus, the course evaluation is performed on each course group with respect to the plurality of evaluation criteria. The evaluation value with respect to each evaluation criterion is calculated for each course group, and a total evaluation value, which is the sum of the evaluation values with respect to the evaluation criteria, is calculated for each course group.

Then, in step S18, a course selection process is executed. In the course selection process, one course group is selected from among the plurality of course groups. For example, one course group is selected based on the total evaluation values of the course groups calculated in step S16. When only one course group is generated, the generated one course group is selected. After the course selection process in step S18 is completed, the control ends.

In the course evaluation apparatus 1 according to the first embodiment, the similar estimated courses among the plurality of estimated courses are classified into one estimated course group. The course evaluation is performed on each estimated course group with respect to at least two different evaluation criteria. Thus, even when there is no estimated course whose evaluation values with respect to the plurality of evaluation criteria are equal to or higher than respective predetermined values, there is the estimated course group whose evaluation values with respect to the plurality of evaluation criteria are equal to or higher than the respective predetermined values. Therefore, it is possible to select an appropriate course, by selecting the estimated course group whose evaluation values with respect to the plurality of evaluation criteria are equal to or higher than the respective predetermined values.

Figure 4:
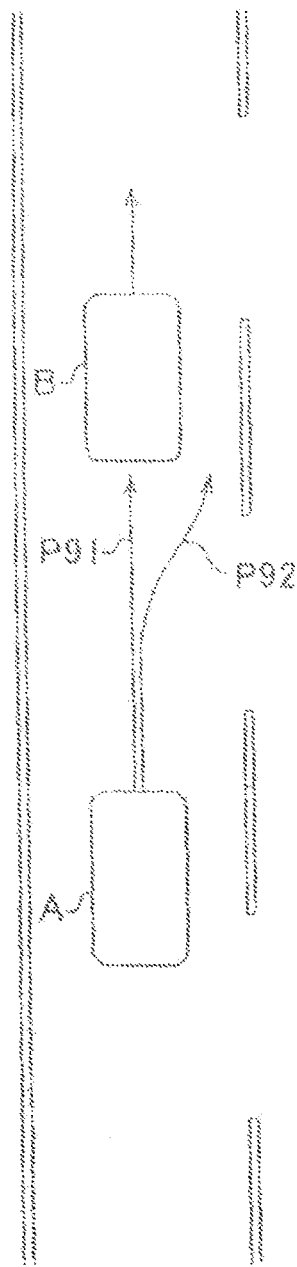
FIG. 4 is a diagram illustrating how courses are evaluated in the course evaluation apparatus shown in FIG. 1.

For example, when the degree of driving safety and the driving efficiency are set as the criteria for the evaluation on the estimated courses, and generated estimated courses p91 and p92 are evaluated without grouping the estimated courses p91 and p92 as shown in FIG. 4, a high evaluation value with respect to the driving efficiency is given to the estimated course p91, because the estimated course p91 is a straight course. However, an extremely low evaluation value with respect to the degree of driving safety is given to the estimated course p91, because the estimated course p91 makes it difficult to avoid the preceding vehicle B if the preceding vehicle B is suddenly braked. In contrast, a high evaluation value with respect to the driving efficiency is not given to the estimated course p92, because the estimated course p92 is a curved course. However, a low evaluation value with respect to the degree of driving safety is not given to the estimated course p92, because the estimated course p92 makes it possible to avoid the preceding vehicle B if the preceding vehicle B is suddenly braked. Therefore, in most cases, the total evaluation value of the estimated course p92 is higher than the total evaluation value of the estimated course p91. When the vehicle travels along the estimated course p92, the vehicle travels safely, but with low efficiency.

In contrast, in the course evaluation apparatus 1 according to the first embodiment, because the estimated courses p91 and p92 have the same course portion in common, the estimated course p91 and p92 are classified into one estimated course group. As a result, a high evaluation value is given to the estimated course group. In this case, unless an emergency situation occurs, for example, unless the preceding vehicle B is suddenly braked, the estimated course p91 is selected so that the vehicle travels along the estimated course p91. When the preceding vehicle B is suddenly braked, the estimated course p92 is selected so that the unexpected situation is avoided. That is, in most cases, the vehicle travels with high driving efficiency. Even in the worst situation, it is possible to ensure the required level of safety.

Also, in the course evaluation apparatus 1 according to the first embodiment, when the course evaluation is performed on each estimated course group, the highest evaluation value among the evaluation values of the courses included in the estimated course group is used as the evaluation value of the estimated course group. Therefore, it is possible to select an appropriate estimated course with respect to the evaluation criteria, and accordingly, to select a good course.

Next, a course evaluation apparatus according to a second embodiment will be described.

Figure 5:
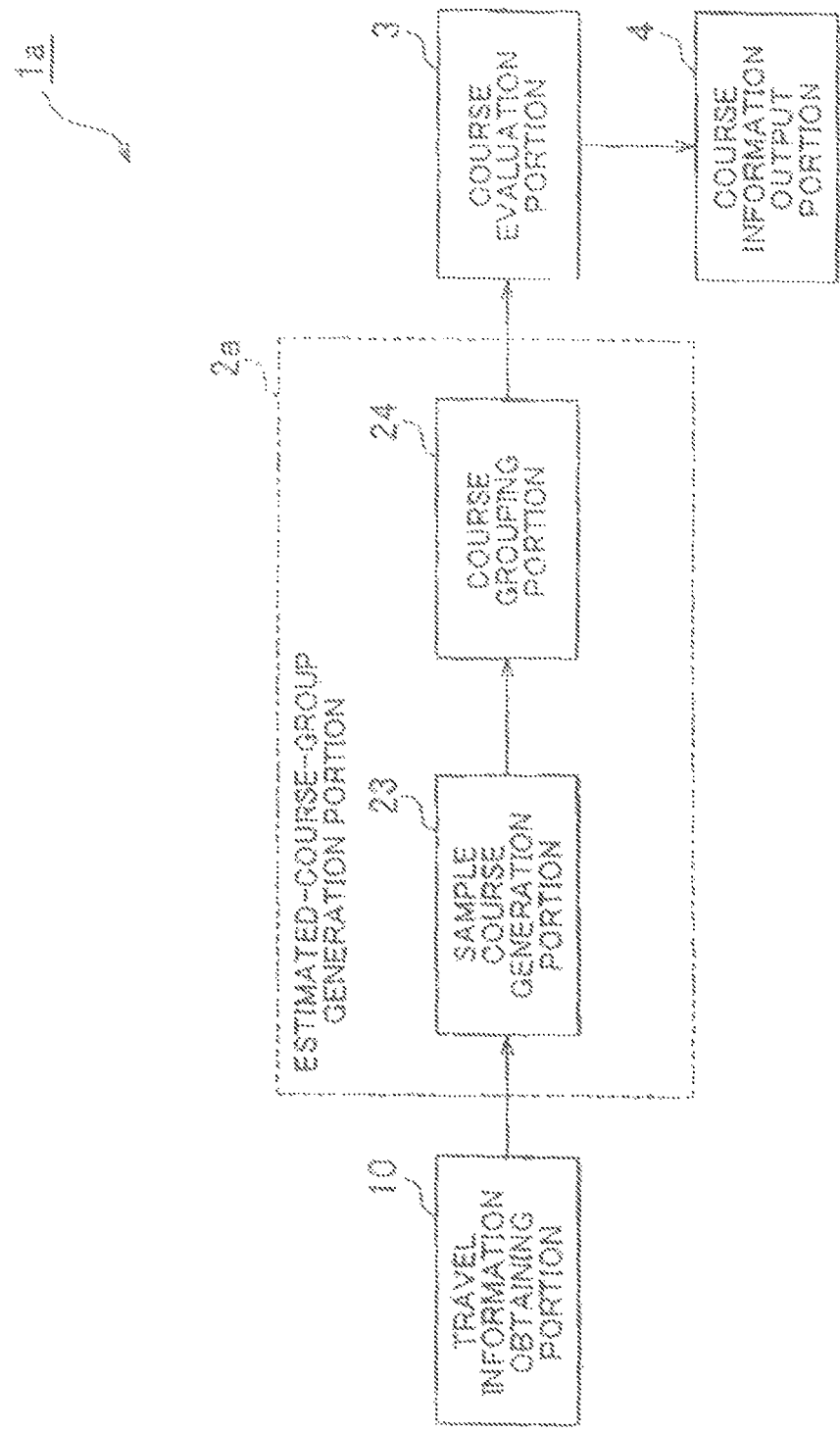
FIG. 5 is a schematic diagram showing the configuration of a course evaluation apparatus according to a second embodiment.

FIG. 5 is a schematic diagram showing the configuration of the course evaluation apparatus according to the second embodiment.

The course evaluation apparatus 1a according to the second embodiment is applied to a controller for an automatically-operated vehicle. The course evaluation apparatus 1a evaluates the estimated courses for the vehicle. The course evaluation apparatus 1a has the substantially same configuration as that of the course evaluation apparatus 1 according to the first embodiment shown in FIG. 1. However, the course evaluation apparatus 1a differs from the course evaluation apparatus 1 in that an estimated-course-group generation portion 2a generates sample courses, and classifies the sample courses into course groups.

As shown in FIG. 5, the course evaluation apparatus 1a according to the second embodiment includes an estimated-course-group generation portion 2a, and the course evaluation portion 3. For example, the course evaluation apparatus 1a is configured mainly using a computer that includes a CPU, a ROM, and a RAM. In the course evaluation apparatus 1a, the functions of the estimated-course-group generation portion 2a and the course evaluation portion 3 are performed using a computer program. In the course evaluation apparatus 1a, the estimated-course-group generation portion 2a and the course evaluation portion 3 may be constituted by separate hardware devices, that is, the functions of the estimated-course-group generation portion 2a and the course evaluation portion 3 may be performed in separate hardware devices.

The estimated-course-group generation portion 2a generates groups of estimated courses for the vehicle. The estimated-course-group generation portion 2a includes a sample course generation portion 23 and a course grouping portion 24. The sample course generation portion 23 generates sample courses for the vehicle. For example, the sample course generation portion 23 generates the sample courses by appropriately sampling possible courses generated based on the travel information output from the travel information obtaining portion 10. For example, the sample courses may be generated by sampling operation amounts at time points at random. The sample courses need not necessarily be generated by performing sampling at random. The sample courses may be generated by other methods, as long as the sample courses, along which the vehicle is able to travel, are generated.

Because the sample courses are generated, the number of the estimated courses is reduced. Therefore, it is possible to reduce a computation load during a predetermined time period in which the course is estimated. Also, it is possible to estimate a long course within a predetermined time period. Particularly when the host vehicle or an object near the host vehicle moves at a high speed, it is effective to generate the sample courses.

The course grouping portion 24 classifies the sample courses generated by the sample course generation portion 23 into groups. The course grouping portion 24 may classify the sample courses into groups in the same manner as the manner described in the first embodiment. That is, when there are similar sample courses among the plurality of sample courses, the similar sample courses are classified into one course group. When there are not similar sample courses among the plurality of sample courses, the plurality of sample courses are classified into respective different course groups. When there is only one sample course, one course group including the only one sample course is generated. The course evaluation portion 3 may include the course grouping portion 24.

Figure 6:
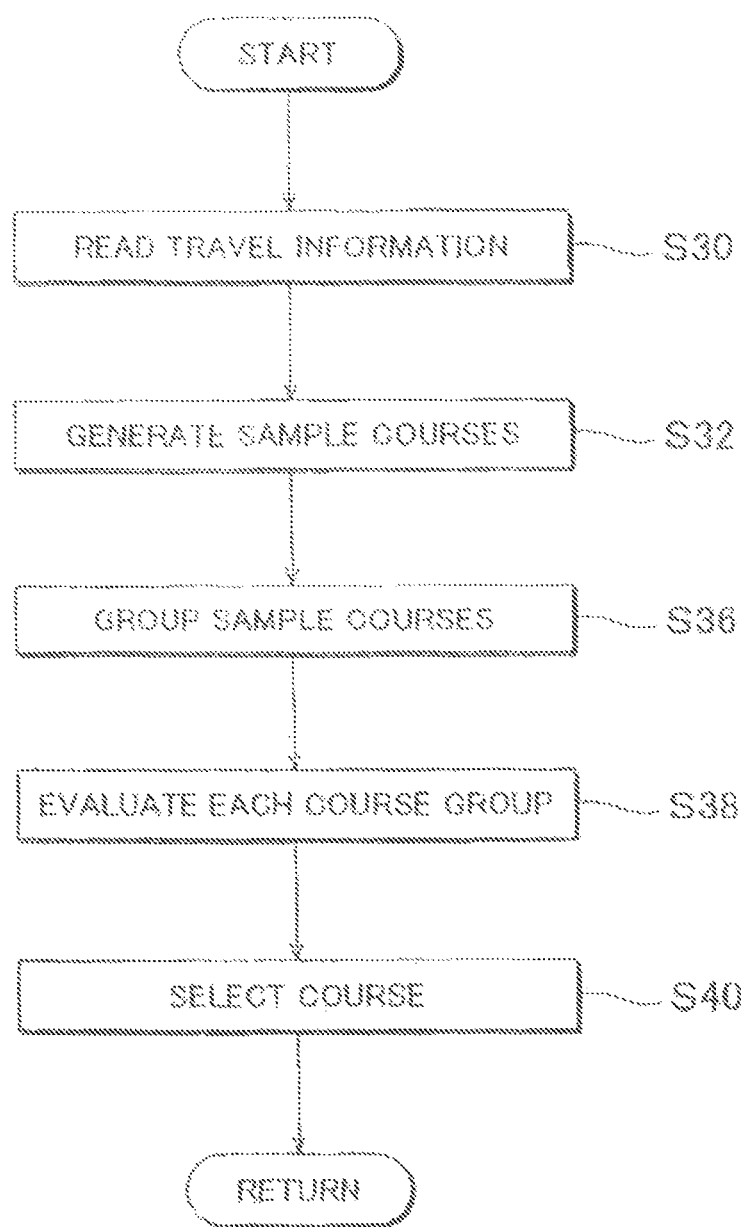
FIG. 6 is a flowchart showing the operation of the course evaluation apparatus shown in FIG. 5.

FIG. 6 is a flowchart showing the operation of the course evaluation apparatus according to the second embodiment.

The control shown in FIG. 6 is executed in a predetermined cycle (for example, a cycle of 100 to 1000 ms), and repeatedly executed. As shown in FIG. 6, first, in step S30, a travel information obtaining process is executed. In the travel information obtaining process, the information on the travel of the vehicle output from the travel information obtaining portion 10 is read. The travel information obtaining process in step S30 in FIG. 6 is executed in the same manner as the manner in which the travel information obtaining process in step S10 in FIG. 3 is executed.

Then, in step S32, a sample course generation process is executed. In the sample course generation process, the sample courses are generated as the estimated courses by sampling the possible courses. For example, the possible courses, along which the vehicle may travel, are generated based on the travel information read in step S30. At this time, the possible close courses are generated, and in addition, the possible subsequent courses continuous with the possible close courses are generated. Then, the sample courses are generated by sampling the courses among all the possible courses at random.

Then, in step S36, a course grouping process is executed. In the course grouping process, the plurality of generated sample courses are classified into groups. For example, similar sample courses among the plurality of sample courses are classified into one group.

Then, in step S38, the course evaluation is performed on each course group. More specifically, the course evaluation is performed on each course group with respect to at least two different criteria. The course evaluation is performed in the same manner as the manner in which the course evaluation is performed in step S16 in FIG. 3.

Then, in step S40, a course selection process is executed. In the course selection process, one course group is selected from among the plurality of course groups. For example, one course group is selected based on the total evaluation values of the course groups calculated in step S38. When only one course group is generated, the generated one course group is selected. After the course selection process in step S40 is completed, the control ends.

Thus, in the course evaluation apparatus 1a according to the second embodiment, it is possible to obtain the same advantageous effects as those obtained in the course evaluation apparatus 1 according to the first embodiment. For example, similar estimated courses among the plurality of estimated courses are classified into one estimated course group. The course evaluation is performed on each estimated course group with respect to at least two different evaluation criteria. Thus, even when there is no estimated course whose evaluation values with respect to the plurality of evaluation criteria are equal to or higher than respective predetermined values, there is the estimated course group whose evaluation values with respect to the plurality of evaluation criteria are equal to or higher than the respective predetermined values. Therefore, it is possible to select an appropriate course, by selecting the estimated course group whose evaluation values with respect to the plurality of evaluation criteria are equal to or higher than the respective predetermined values.

Also, the sample courses are generated as the estimated courses by sampling the possible courses, in a manner such that the number of the sample courses is smaller than the number of the possible courses. Therefore, in addition to the same advantageous effect obtained in the course evaluation apparatus 1 according to the first embodiment, it is possible to reduce a processing load for the course evaluation, and to evaluate a longer course. Particularly when the vehicle moves at a high speed, it is effective to generate the sample courses.

Next, a course evaluation apparatus according to a third embodiment will be described.

The course evaluation apparatus according to each of the first embodiment and the second embodiment is applied to a controller for an automatically-operated vehicle. However, the course evaluation apparatus according to the third embodiment is applied to a driving support system for a vehicle. For example, the course evaluation apparatus provides information on the course that is highly evaluated, to the driving support system. After the driving support system receives the information, the driving support system provides an instruction on a driving operation to the driver of the vehicle so that the vehicle travels along the course provided to the driving support system.

The course evaluation apparatus according to the third embodiment has the substantially same hardware configuration as that of the course evaluation apparatus according to each of the first embodiment and the second embodiment. However, the course evaluation apparatus according to the third embodiment differs from the course evaluation apparatus according to each of the first embodiment and the second embodiment, in that one evaluation criterion, such as the driving safety, is weighted to be a higher value than another evaluation criterion when the course evaluation is performed on each estimated course group.

In the first embodiment, when the course evaluation portion 3 performs the course evaluation on each estimated course group, the highest evaluation value among the evaluation values of the estimated courses that belong to the estimated course group is used as the evaluation value of the estimated course group. However, in the third embodiment, the course evaluation is performed on each estimated course group based on whether the evaluation value of each estimated course included in the estimated course group with respect to each evaluation criterion is equal to or higher than a predetermined threshold value.

For example, when there are a plurality of courses in the estimated course group, and each of the plurality of courses is evaluated with respect to two evaluation criteria, that is, the degree of driving safety and the driving efficiency, a predetermined threshold value for the degree of driving safety, and a predetermined threshold value for the driving efficiency are set, and each course is evaluated with respect to the degree of driving safety and the driving efficiency. It is determined whether the evaluation value with respect to the degree of driving safety is equal to or higher than the predetermined threshold value for the degree of driving safety, and whether the evaluation value with respect to the driving efficiency is equal to or higher than the predetermined threshold value for the driving efficiency. If the evaluation value of at least one course in the estimated course group with respect to the degree of driving safety or the driving efficiency is lower than the predetermined threshold value, the evaluation value of the estimated course group is decreased according to the number of the courses whose evaluation value is lower than the threshold value. As a result, the course whose evaluation value with respect to the evaluation criterion is low is unlikely to be selected, and thus, the course whose evaluation value with respect to the evaluation criterion is appropriately high is selected.

In the course evaluation apparatus according to the third embodiment, the course evaluation is performed on each estimated course group based on whether the evaluation value of each course included in the estimated course group with respect to each evaluation criterion is equal to or higher than the predetermined threshold value. Accordingly, it is possible to avoid the situation where the vehicle travels along the course that has an extremely low evaluation value with respect to the evaluation criterion such as the degree of driving safety. That is, the course, along which the driver of the vehicle can easily perform the driving operation, is highly evaluated. Thus, the course evaluation is appropriately performed to provide an appropriate course to the driving support system.

Thus, by using the course evaluation apparatus according to the third embodiment for the driving support system, it is possible to reduce the possibility that the driver is instructed to perform a difficult driving operation when the driving support system is operated.

Next, a course evaluation apparatus according to a fourth embodiment will be described.

In the course evaluation apparatus according to the fourth embodiment, the state of generation of the estimated courses is changed according to the vehicle speed of the vehicle.

Figure 7:
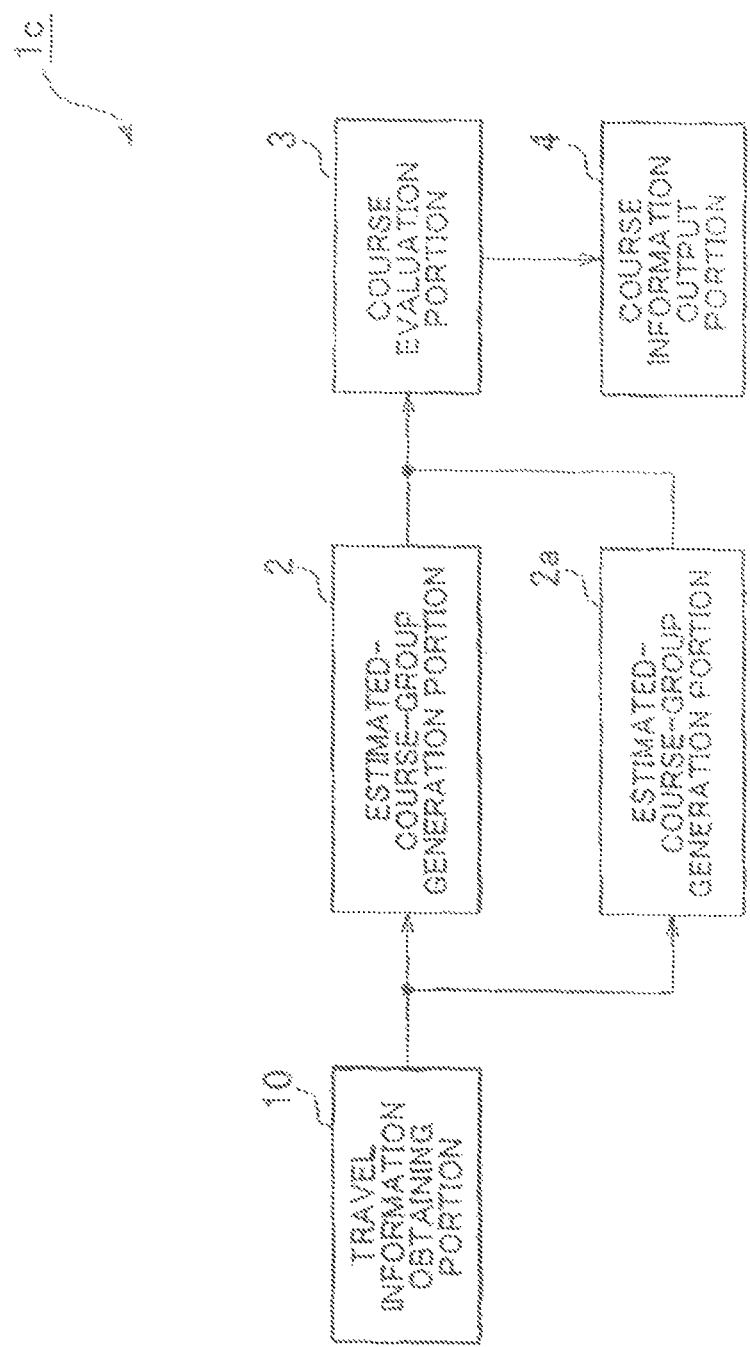
FIG. 7 is a schematic diagram showing the configuration of a course evaluation apparatus according to a fourth embodiment.

FIG. 7 is a schematic diagram showing the configuration of the course evaluation apparatus according to the fourth embodiment. As shown in FIG. 7, the course evaluation apparatus 1c according to the fourth embodiment includes two estimated-course-group generation portions 2 and 2a. If the vehicle speed of the vehicle is equal to or higher than a preset vehicle speed value, the estimated-course-group generation portion 2a generates the estimated courses, and generates the estimated course group. If the vehicle speed of the vehicle is lower than the preset vehicle speed value, the estimated-course-group generation portion 2 generates the estimated courses, and generates the estimated course group.

In the course evaluation apparatus 1c according to the fourth embodiment, if the vehicle speed of the vehicle is equal to or higher than the set vehicle speed value, the sample courses are generated as the estimated courses by sampling the generated possible courses, in a manner such that the number of the sample courses is smaller than the number of the possible courses. If the vehicle speed of the vehicle is lower than the set vehicle speed value, the generated possible courses are used as the estimated courses. Thus, if the vehicle travels at a high speed, it is possible to reduce the number of the estimated courses, and to evaluate a long course. If the vehicle travels at an intermediate speed or a low speed, it is possible to accurately evaluate the estimated course in detail.

In the above-described course evaluation apparatus $1c$, one of the estimated-course-group generation portions 2 and $2a$ is appropriately selected according to the speed value. However, one of the estimated-course-group generation portions 2 and $2a$ may be appropriately selected according to the type of a road on which the vehicle is traveling, or a traffic situation around the vehicle. For example, if the road on which the vehicle is traveling is an expressway or a freeway that is not an ordinary road, the sample courses may be generated as the estimated courses by sampling the generated possible courses, in a manner such that the number of the sample courses is smaller than the number of the possible courses. If the road on which the vehicle is traveling is an ordinary road, the generated possible courses may be used as the estimated courses. In this case, for example, information on the road on which the vehicle is traveling may be obtained, and it may be determined which of the estimated-course-group generation portions 2 and $2a$ should be used to generate the course group, based on the information on the road. Also, if the degree of congestion on the road on which the vehicle is traveling is lower than a predetermined value, the sample courses may be generated as the estimated courses by sampling the generated possible courses, in a manner such that the number of the sample courses is smaller than the number of the possible courses. If the degree of congestion on the road on which the vehicle is traveling is equal to or higher than the predetermined value, the generated possible courses may be used as the estimated courses. In this case, the degree of congestion may be determined based on, for example, image information obtained by a vehicle-mounted camera. Also, road traffic information may be obtained through road-to-vehicle communication, and the degree of congestion may be determined based on the road traffic information. In each of the course evaluation apparatuses as well, it is possible to appropriately perform the course evaluation according to the environment in which the vehicle is traveling, as in the above-described course evaluation apparatus $1c$.

Although the course evaluation apparatus according to each of the above-described embodiments has been described, the invention is not limited to the embodiments. Modifications may be made to the course evaluation apparatus according to each of the above-described embodiments without departing from the scope of the invention.

In each of the above-described embodiments, the course evaluation apparatus is applied to an automatically-operated vehicle or a driving support system. However, the course evaluation may be applied to other moving bodies or apparatuses.

What is claimed is:

1. A movable body comprising:
  a travel information obtaining portion configured to obtain a travel information that includes travel information of the vehicle, surrounding area information of the vehicle, and or map information;
  an estimated course generation portion configured to generate a plurality of courses based on the travel information;
  a grouping portion configured to set a course group by grouping the plurality of courses;
  a course evaluation portion configured to perform a course evaluation of the course group with respect to at least two different evaluation criteria from among a degree of driving safety, a driving efficiency and a degree of observance of driving rules; and
  an output portion configured to select a course along which the vehicle should travel based on the result of course evaluation, and output information on the selected course to a drive control unit and a steering control unit of the vehicle,
  wherein:
  the estimated course generation portion includes (i) a close course generation portion configured to generate a close course that is close to the vehicle and (ii) a subsequent course generation portion configured to generate a subsequent course that extends from the close course, and
  the grouping portion sets a plurality of course groups from a plurality of the close courses and a plurality of the subsequent courses.

2. The movable body according to claim 1, wherein the course evaluation portion sets the highest evaluation value among the evaluation values of the courses that belong to the course group as the result of the course evaluation of the course group.

3. The movable body according to claim 1, wherein the course evaluation portion sets the highest evaluation value among the evaluation values of the courses that belong to the course group as the evaluation value of the course group.

4. The movable body according to claim 1, wherein the course evaluation portion performs the course evaluation based on whether an evaluation value of the course that belongs to the course group is equal to or greater than a predetermined threshold set for the evaluation criteria.

5. The course evaluation apparatus according to claim 1, wherein:
  the estimated-course-group generation portion generates sample courses as estimated courses by sampling generated possible courses, in a manner such that a number of the sample courses is smaller than a number of the generated possible courses.

6. The course evaluation apparatus according to claim 1, wherein:
  if a moving speed of the movable body is equal to or higher than a set speed value, the estimated-course-group generation portion generates sample courses as estimated courses by sampling generated possible courses, in a manner such that a number of the sample courses is smaller than a number of the generated possible courses; and
  if the moving speed of the movable body is lower than the set speed value, the estimated-course-group generation portion uses the generated possible courses as the estimated courses.

7. The course evaluation apparatus according to claim 1, wherein:
  the movable body is a vehicle that travels on a road;
  if the road on which the vehicle travels is an expressway or a freeway that is not an ordinary road, the estimated-course-group generation portion generates sample courses as estimated courses by sampling generated possible courses, in a manner such that a number of the sample courses is smaller than a number of the generated possible courses; and if the road on which the vehicle travels is the ordinary road, the estimated-course-group generation portion uses the generated possible courses as the estimated courses.

8. The course evaluation apparatus according to claim 1, wherein:

the movable body is a vehicle that travels on a road;

if a degree of congestion on a road on which the vehicle travels is lower than a predetermined value, the estimated-course-group generation portion generates sample courses as estimated courses by sampling generated possible courses, in a manner such that a number of the sample courses is smaller than a number of the generated possible courses; and if the degree of congestion on the road on which the vehicle travels is equal to or higher than the predetermined value, the estimated-course-group generation portion uses the generated possible courses as the estimated courses.

9. The course evaluation apparatus according to claim 1, wherein the grouping portion sets similar courses into a same course group.

10. The course evaluation apparatus according to claim 1, wherein the grouping portion sets the courses into a same course group when a plurality of courses are continuous with the same close course, the directions of a plurality of courses are in a predetermined range, or a plurality of courses exist within a predetermined range.

11. A movable body comprising:

a travel information obtaining portion configured to obtain a travel information that includes travel information of the vehicle, surrounding area information of the vehicle, or map information;

an estimated course generation portion configured to generate a plurality of courses based on the travel information;

a grouping portion configured to set a course group by grouping the plurality of courses;

a course evaluation portion configured to perform a course evaluation of the course group with respect to at least two different evaluation criteria from among a degree of driving safety, a driving efficiency and a degree of observance of driving rules;

an output portion configured to select a course along which the vehicle should travel based on the result of course evaluation, and provide information on the selected course; and a driving support system providing an instruction on a driving operation so that the vehicle travels along the selected course, wherein:

the estimated course generation portion includes (i) a close course generation portion configured to generate a close course that is close to the vehicle and (ii) a subsequent course generation portion configured to generate a subsequent course that extends from the close course, and the grouping portion sets a plurality of course groups from a plurality of the close courses and a plurality of the subsequent courses.

12. A vehicle comprising a controller configured to perform:

obtaining travel information that includes travel information of the vehicle, surrounding area information of the vehicle, or map information;

generating a plurality of estimated courses based on the travel information;

setting a course group by grouping the plurality of estimated courses;

performing a course evaluation of the course group with respect to at least two different evaluation criteria selected from among a degree of driving safety, a driving efficiency and a degree of observance of driving rules;

setting an evaluation value to the course group based on the result of the course evaluation;

selecting the course group based on the evaluation value; and outputting information on the selected course to a drive control unit and a steering control unit of the vehicle, wherein:

generating the plurality of estimated courses based on the travel information comprises generating a close course that is close to the vehicle, and generating a subsequent course that extends from the close course; and setting the course group comprises setting a plurality of course groups from a plurality of the close courses and a plurality of the subsequent courses.

* * * * *